United States Patent Office 3,578,643
Patented May 11, 1971

3,578,643
NEW POLYMERS FROM NITRILOTRIACETO-
NITRILE AND IMINODIACETONITRILE
Louis L. Wood, Potomac, Md., and Richard A. Hamilton,
Houston, Tex.; said Wood assignor to W. R. Grace &
Co., New York, N.Y.
No Drawing. Filed June 6, 1969, Ser. No. 831,232
Int. Cl. C08g 33/02
U.S. Cl. 260—78.4               15 Claims

ABSTRACT OF THE DISCLOSURE

Polymers of nitrilotriacetonitrile and iminodiacetonitrile alone and in combination have been prepared. These polymers on pyrolysis yield electrically conducting materials having the same general shape as the starting prepyrolyzed material.

---

This invention relates to producing novel polymers from nitrilotriacetonitrile, iminodiacetonitrile and mixtures of nitrilotriacetonitrile and iminodiacetonitrile. It further relates to pyrolyzing these polymers to produce a product that is electrically conductive.

Polymeric nitriles produced from a single nitrile monomer or from two different nitrile monomers by nitrile group reaction is new to the art. It has been known to coreact formaldehyde with an amino hydrogen containing aminonitrile to produce polymeric condensation products. However, such products are soft and are soluble in organic solvents, acids and bases. In contrast, the nitrile polymers of the present invention are insoluble in all of the common organic solvents and in acids and bases. They are also hard and highly heat resistant.

The heat resistance of these polymers coupled with inertness to organic and aqueous solvents make these polymers useful catalyst carriers or insulators. The monomers can be melt reacted in a mold having the final shape desired. It is also within the present invention to solution polymerize. This polymerization yields a particulate solid which is compressed to a final shape. Also, fillers such as metal or metal oxide powders and filaments can be added during polymerization which will be embedded in the final polymer matrix. These polymers will be useful as furnace insulation and as potting materials for thermocouples and thermisters. By being inert to organic solvents and aqueous solutions, the use of articles fabricated from these polymers will not be restricted by environmental conditions.

Another use of these novel polymers is in the production of electrically conducting substances. On pyrolysis of these polymers of iminodiacetonitrile, nitrilotriacetonitrile and mixtures of iminodiacetonitrile and nitrilotriacetonitrile, a polymeric electrically conductive composition is formed. These compositions are carbon, hydrogen, oxygen and nitrogen containing substances and can be produced in any shape or size. To produce a desired shape, it is only necessary to use a mold of that shape during nitrile polymerization if a melt process is used. In solution polymerization, the polymer can be cast or extruded to a shape. After polymerization, the shape has been defined and pyrolysis can take place within the mold or with the surfaces exposed. These hard compositions are useful as current collecting brushes or can be used in semiconductor applications.

Conductive carbonaceous materials have been produced by pyrolysis of polymeric materials. However, the polymers pyrolyzed have been mainly carbonaceous to produce graphitic conductive polymers. Polyacrylonitrile has also been pyrolyzed to produce electrically conductive polymers. However, the electrically conductive polymers of the present invention are heat stable and have a high nitrogen content. This high percentage of bonded nitrogen increases the hardness and thermal stability of these conductive polymers. It is also possible to readily produce shaped conductive polymers.

It is an object of this invention to produce novel polymers from a monomer nitrile or a mixture of monomer nitriles.

It is also an object of this invention to produce novel electrically conductive polymers.

It is further an object of this invention to set out a method of polymerizing organonitriles by nitrile group reaction.

More specifically, this invention relates to polymerization of nitrile monomers having a structure

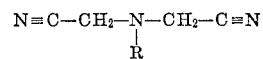

wherein R is selected from the group consisting of hydrogen, and —CH$_2$—CH$_2$—C≡N. These nitriles can be polymerized in a molten state or in a solvent. A base catalyst is used to initiate reaction in either condition. The polymerizations are conducted in air or an inert atmosphere with little variation in results. The polymers formed are dark non-melting insoluble polymeric solids with good resistance to thermal degradation. On pyrolysis of these polymers at from about 500° C. to about 1500° C. hard dark carbonaceous solids containing carbon, hydrogen, oxygen and nitrogen are produced. These pyrolyzed solids, which retain the same general shape as the starting polymer, have an electrical resistance of from about $10^{13}$ ohm-cm. to about 38 ohm-cm.

The monomers of this invention are known substances as to their properties and synthesis. Iminodiacetonitrile was first produced in 1894 by the reaction of hexamine with hydrogen cyanide under acid conditions. Pure iminodiacetonitrile is a white solid melting at 78° C. Nitrilotriacetonitrile is produced by the reaction of hexamethylenetetramine with formaldehyde and hydrocyanic acid in the presence of sulfuric acid. The mole ratio of reactants is 1:6:12 respectively and the pH is maintained at about 1. Nitrilotriacetonitrile is produced in good yield.

Broadly, the polymerization of iminodiacetonitrile (IDAN), nitrilotriacetonitrile (NTAN) or mixtures of these monomers can be carried out at from about 0° C. to about 200° C. More ideally, the polymerization temperature is maintained at from about 70° C. to about 165° C. when polymerization is from the melt; and from about 20° C. to about 90° C. for polymerization from solution. The suitable solvents for solution polymerization are organic alcohols, ethers, esters, amides, sulfoxides and aromatic hydrocarbons. The preferred solvents consist of methanol, ethanol, isopropanol, butanol, tetrahydrofuran, 1,2-dimethoxyethane, diethylene glycol, dimethylether, benzene, toluene, xylene, mono- and dichlorobenzene, chloroxylene, mineral oil and decalin.

The basic catalysts are used for both polymerization from the melt and from solution. Suitable base catalysts are the metal hydrides, alkaline hydroxides, alkoxides, alkaline cyanides, alkaline alkyls and amines. The preferred base catalysts are the alkoxides of sodium, especially sodium methoxide; the cyanides of sodium and potassium; lithium alkyls and diamines such as N,N-bicyclohexamethylene diamine (DABCO). Other secondary amines and also primary and tertiary amines produce polymers in good yields. In the melt polymerization the catalyst is added in a solvent which is then removed.

The time for polymerization depends mainly on whether polymerization is from the melt or from a solution. Polymerizations from the melt generally vary from 1 to 16 hours, while polymerizations from solution generally require 1 to 14 days. This variation of time of polymerization is due mainly to the lower temperatures and degree of molecule contact in solution polymerization. However, solution polymerization is more versatile in that prior to completion of the polymerization, the solvent can be partly removed and the resultant liquid prepolymer cast into a mold or impregnated into a fabric for final curing. In melt polymerizations, the product generally retains the shape of the reaction mold. For solution polymerization completely conducted in the presence of a solvent finely divided insoluble non-melting powders are formed.

The preferred embodiments for polymerization from the melt are set out in Table I. The catalysts are added as 0.1 molar solutions in methanol or hexane. This solvent is then removed by passing a slow stream of argon through the molten monomers for about 5 minutes. The preferred embodiments for solution polymerization are set out in Table II. The polymers produced by the solution technique are orange to brown solids. Table III sets out typical elemental analysis for these polymers. Of significance is the high bonded nitrogen content of these polymers, which it is theorized extensively contributes to the thermal properties of these polymers.

TABLE I
[Melt polymerizations]

| Run No. | NTAN (moles) | IDAN (moles) | Catalysts | (Moles) | Polymerization time, hours | Temp., °C. |
|---|---|---|---|---|---|---|
| 3 | 0.1 |  | NaOCH$_3$ | 1×10$^{-4}$ | 16 | 130-135 |
| 7 | 0.1 |  | KCN | 1×10$^{-4}$ | 16 | 130-135 |
| 9 | 0.1 |  | DABCO | 5×10$^{-4}$ | 16 | 130-135 |
| 11 | 0.1 |  | LiC$_9$H$_9$ | 1×10$^{-4}$ | 16 | 130-135 |
| 12 | 0.1 |  | NaOCH$_3$ | 1×10$^{-4}$ | 16 | 125-130 |
| 15 | 0.1 |  | NaOCH$_3$ | 5×10$^{-5}$ | 16 | 120 |
| 19 | 0.05 | 0.05 | NaOCH$_3$ | 1×10$^{-4}$ | 16 | 125-130 |
| 21 | 0.075 | 0.025 | NaOCH$_3$ | 1×10$^{-4}$ | 60 | 125-130 |
| 22 | 0.075 | 0.025 | NaOCH$_3$ | 1×10$^{-6}$ | 60 | 125-130 |

TABLE II
[Solution polymerizations]

| Run No: | NTAN (moles) | IDAN (moles) | Catalyst | (Moles) | Polymerization time, days | Temp., °C. | Solvent |
|---|---|---|---|---|---|---|---|
| 1 | 0.1 |  | NaOCH$_3$ | 0.1 | 14 | 25 | Methanol. |
| 13 | 0.1 |  | NaOCH$_3$ | 1×10$^{-3}$ | 14 | 25 | Do. |
| 6 |  | 0.1 | NaOCH$_3$ | 0.1 | 14 | 25 | Do. |
| 8 |  | 0.1 | NaOCH$_3$ | 1×10$^{-3}$ | 14 | 25 | Do. |

TABLE III
[C, H, N, O analysis of melt polymers]

| Run No. | Percent | | | |
|---|---|---|---|---|
|  | C | H | N | O |
| 3 | 52.28 | 4.49 | 40.14 | 4.09 |
| 12 | 52.84 | 4.72 | 39.16 | 2.68 |
| 15 | 53.21 | 4.29 | 38.37 | 4.13 |
| 19 | 50.91 | 5.04 | 39.71 | 4.34 |
| 20 | 50.12 | 4.89 | 39.10 | 5.89 |
| 22 | 52.01 | 4.88 | 40.39 | 2.72 |

In the polymers which are mixtures of iminodiacetonitrile and nitrilotriacetic acid the concentration of either monomer can vary from about 1% to about 99%. The monomers are readily reactive alone or together. These mixtures produce dark non-melting insoluble polymeric solids with good resistance to thermal degradation.

From these polymers, either in a solid cast, impregnated or powder condition, electrically conductive polymers are produced by pyrolysis. These polymers of iminodiacetonitrile, nitrilotriacetonitrile and copolymers of iminodiacetonitrile and nitrilotriacetonitrile are not electrically conductive prior to pyrolysis. During pyrolysis, the polymers in their original form or as compressed powders are heated to about 1000° C. in an inert atmosphere for from 1 to 24 hours. A temperature of about 1000° C. is preferred although a temperature of about 500° C. to about 1500° C. can be used. The inert gas may be any of the inert gases of group O or nitrogen. The resulting conductive polymers are hard carbonaceous solids of a decreased density.

The preferred embodiments of pyrolysis are set out in Table IV. The percent weight loss for pyrolysis in nitrogen at 1000° C. for 6 hours is about 50%. On pyrolysis at 500° C. under the same conditions and for the same period of time, there is an average weight loss of about 25%. From the elemental analysis before and after pyrolysis it is apparent that the conductive polymers retain about half of their nitrogen content. It is believed that this bonded nitrogen content contributes extensively to both the conductivity and the thermal stability.

Resistivity measurements on these conductive polymers are made by cutting specimens 2 cm. in diameter by 0.2 cm. thick from a block of polymer. This specimen is then clamped between 1 cm. diameter disk electrodes and the resistivity measured with a standard VOM meter. These measurements are conducted while the sample is at room temperature and immersed in liquid nitrogen (−195° C.). Resistivities of these polymers are set out in Table IV.

TABLE IV

| Polymer | Composition | Temp., °C. of pyrolysis | Conductive polymer composition | Resistivity in ohm-cm. | |
|---|---|---|---|---|---|
|  |  |  |  | 25° C. | −195° C. |
| NTAN | 52.95% C, 4.72% H, 2.80% O, 39.83% N. | 1,000 | 59.40% C, 1.33% H, 7.77% O, 17.44% N. | 38.5 | 69.4 |
| NTAN | 52.40% C, 4.57% H, 4.41% O, 38.84% N. | 1,000 | 69.7% C, 1.40% H, 8.25% O, 15.99% N. | 39.1 | 66.5 |
| IDAN | 57.88% C, 2.58% H, 7.60% O, 32.15% N. | 1,000 | 71.20% C, 1.38% H, 8.61% O, 18.75% N. | 38.5 | 65.5 |
| IDAN | 51.88% C, 4.72% H, 2.18% O, 32.17% N. | 1,000 | 71.50% C, 1.20% H, 8.39% O, 16.90% N. | 37.5 | 64.6 |

The following examples are set out to further amplify the present invention.

EXAMPLE 1

A reaction vessel equipped with a thermostatically controlled heating mantle, and capable of being sealed is assembled. 0.1 mole of nitrilotriacetonitrile is added to the vessel and the vessel is heated to produce a melt of the nitrilotriacetonitrile. 1×10$^{-4}$ moles of sodium methoxide is added as a 0.1 molar solution in methanol. This catalyst solution is mixed with the molten monomer and a stream of argon is bubbled through the melt for 5 minutes to remove traces of methanol. The vessel is then swept with nitrogen to remove air, sealed, and heated from 130° C. to 135° C. This temperature is maintained for 16 hours. The product is a dark solid polymer in about 100% yield. The elemental analysis shows a polymer of 52.28% C, 4.49% H, 40.14% N, and 3.09% O.

EXAMPLE 2

The same apparatus as in Example 1 is used. 0.1 mole of nitrilotriacetonitrile is added to the vessel and the vessel is heated to produce a melt of the nitrilotriacetonitrile. $5 \times 10^{-4}$ moles of potassium cyanide as a 0.1 molar solution of potassium cyanide in methanol is added. This catalyst solution is mixed with the molten monomer and a stream of argon is bubbled through the melt for 5 minutes to remove traces of methanol. The vessel is then heated from 130° C. to 135° C. This temperature is maintained for 16 hours. The product is a dark solid polymer in about 97% yield.

EXAMPLE 3

The same apparatus as in Example 1 is used. 0.1 mole of iminodiacetonitrile is added to the vessel and the vessel is heated to produce a melt of the iminodiacetonitrile. $1 \times 10^{-4}$ moles of sodium methoxide as a 0.1 molar solution of sodium methoxide in methanol is added. This catalyst solution is mixed with the molten monomer and a stream of argon is bubbled through the melt for 5 minutes to remove traces of methanol. The vessel is then heated from 130° C. to 135° C. This temperature is maintained for 16 hours. The product is a dark solid polymer.

EXAMPLE 4

The same apparatus as in Example 1 is used. 0.05 mole of nitrilotriacetonitrile and 0.05 mole of iminodiacetonitrile are added to the vessel and the vessel heated to produce a melt of the nitrilotriacetonitrile and the iminodiacetonitrile. $1 \times 10^{-4}$ moles of sodium methoxide as a 0.1 molar solution of sodium methoxide in methanol is added. This catalyst solution is mixed with the molten monomers and a stream of argon is bubbled through the melt for 5 minutes to remove traces of methanol. The vessel is then heated from 130° C. to 135° C. This temperature is maintained for 16 hours. The resulting polymer has an elemental analysis of 50.91% C, 5.04% H, 39.71% N, and 4.34% O.

EXAMPLE 5

A 250 ml. reaction vessel equipped with a stirrer, thermometer, thermostatically controlled heating mantle, and condenser which is capable of being sealed is assembled. 0.1 mole of nitrilotriacetonitrile in 100 ml. of methanol is added to the vessel. 0.1 mole of sodium methoxide as a 0.1 molar solution of sodium methoxide in methanol is added to the vessel and the solution is stirred. The vessel is sealed and the temperature is maintained at 25° C. for 14 days. The evaporation of the methanol after this period of time left an orange oil which cured to a brown polymeric solid.

EXAMPLE 6

The apparatus of Example 5 is used. 0.1 mole of iminodiacetonitrile in 100 ml. of methanol is added to the vessel. 0.01 mole of potassium cyanide as a 0.01 molar solution of potassium cyanide in methanol is added. This solution is stirred, the vessel sealed and the temperature maintained at 25° C. for 14 days. The evaporation of the methanol solvent after this period of time left a yellow polymeric solid.

EXAMPLE 7

For pyrolysis, a Lundberg furnace is assembled having a quartz tube, sample boat and ports for flowing an inert gas over the sample boat. The polymer of Example 1 is placed in the boat which is then inserted into the furnace. The furnace is heated to 1000° C. and the sample maintained in a nitrogen atmosphere. Heating is continued for 6 hours. There is registered a 52% loss of weight of the polymer. This pyrolyzed polymer is cooled and its resistivity tested. The resistivity at 25° C. is 39.1 ohm-cm. and at 195° C. is 66.5 ohm-cm.

EXAMPLE 8

The same apparatus as in Example 7 is used. The polymer of Example 3 is placed in the sample boat which is then inserted into the furnace. The furnace is heated to 1000° C. and the sample is maintained in a nitrogen atmosphere. Heating is continued for 6 hours. There is registered at 42% loss of weight of the polymer. This pyrolyzed polymer is cooled and its resistivity tested. The resistivity at 25° C. is 38.5 ohm-cm. and at 195° C. is 65.5 ohm-cm.

The above examples further illustrate the novel and useful polymers of the present invention and the means of their synthesis.

We claim:
1. A polymer of the monomer nitrilotriacetonitrile.
2. A polymer of the monomer iminodiacetonitrile.
3. A polymer of nitrilotriacetonitrile and iminodiacetonitrile.
4. The method of producing a polymer from monomer nitriles having the structure

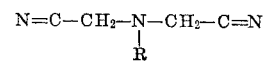

wherein R is hydrogen or cyanoalkyl comprising, contacting said nitriles with a base catalyst, maintaining the temperature between about 0° C. and about 200° C. during said contacting, recovering said polymer.

5. The method of claim 4 of producing a polymer wherein said monomer nitrile is selected from the group consisting of nitrilotriacetonitrile and iminodiacetonitrile.

6. The method of claim 4 of producing a polymer wherein said monomer nitrile is a mixture of nitrilotriacetonitrile and iminodiacetonitrile.

7. The method of claim 4 of producing a polymer wherein said base catalyst is selected from the group consisting of alkali cyanide and alkali methoxide and N,N-bicyclohexamethylene diamine and $LiC_6H_9$.

8. The method of claim 4 of producing a polymer wherein said contacting occurs in a melt.

9. The method of claim 8 of producing a polymer wherein said melt is maintained at a temperature from about 70° C. to about 150° C.

10. The method of claim 4 of producing a polymer wherein said contacting occurs in an organic solvent.

11. The method of claim 10 of producing a polymer wherein said contacting temperature is from about 20° C. to about 80° C.

12. The method of producing nitrogen containing electrically conductive polymers comprising pyrolyzing a polymer selected from the group consisting of polynitrilotriacetonitrile and polyiminodiacetonitrile and copolymers of nitrilotriacetonitrile and iminodiacetonitrile at a temperature from about 500° C. to about 1500° C. in an inert atmosphere, and recovering a carbonaceous conductive polymer.

13. The method of claim 12 wherein the pyrolyzing temperature is about 1000° C.

14. The method of claim 13 wherein the inert gas is nitrogen.

15. The electrically conductive polymer produced by the process comprising pyrolyzing a polymer selected from the group consisting of polynitrilotriacetonitrile and polyiminodiacetonitrile and copolymers of nitrilotriacetonitrile and iminodiacetonitrile at a temperature from about 500° C. to about 1500° C. in an inert atmosphere.

References Cited
FOREIGN PATENTS 1,360,715   5/1964   France _____ C—07c
1,015,612   1/1966   Great Britain _____ C—08f JOSEPH L. SCHOFER, Primary Examiner
J. KIGHT, Assistant Examiner U.S. Cl. X.R.
252—511